July 28, 1936.     J. C. DUNHAM     2,049,111
AUTOMATIC LOCK FOR STEERING DEVICES
Filed Aug. 27, 1935     4 Sheets-Sheet 1
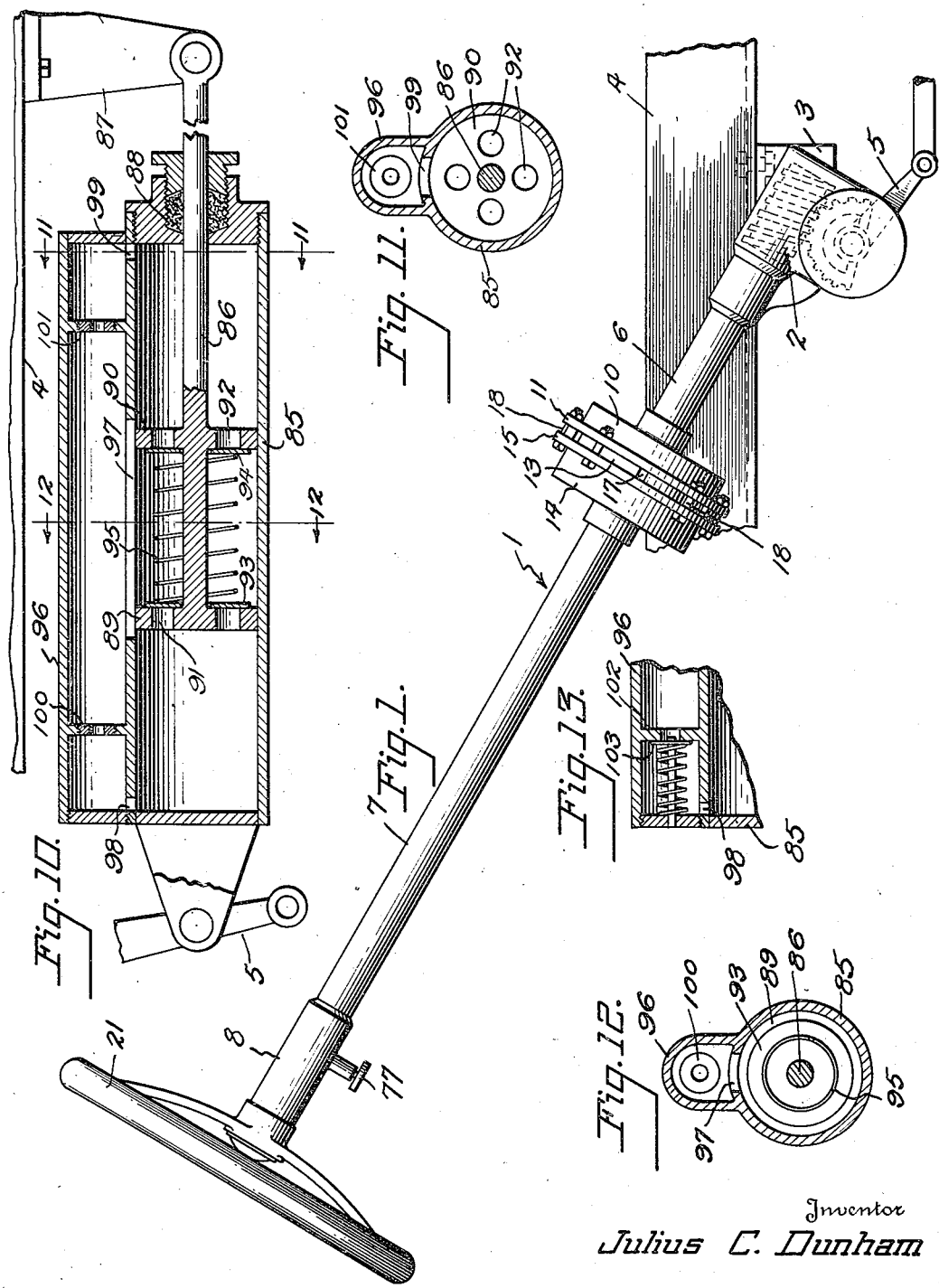
Inventor
Julius C. Dunham
By Mason Fenwick Lawrence
Attorneys

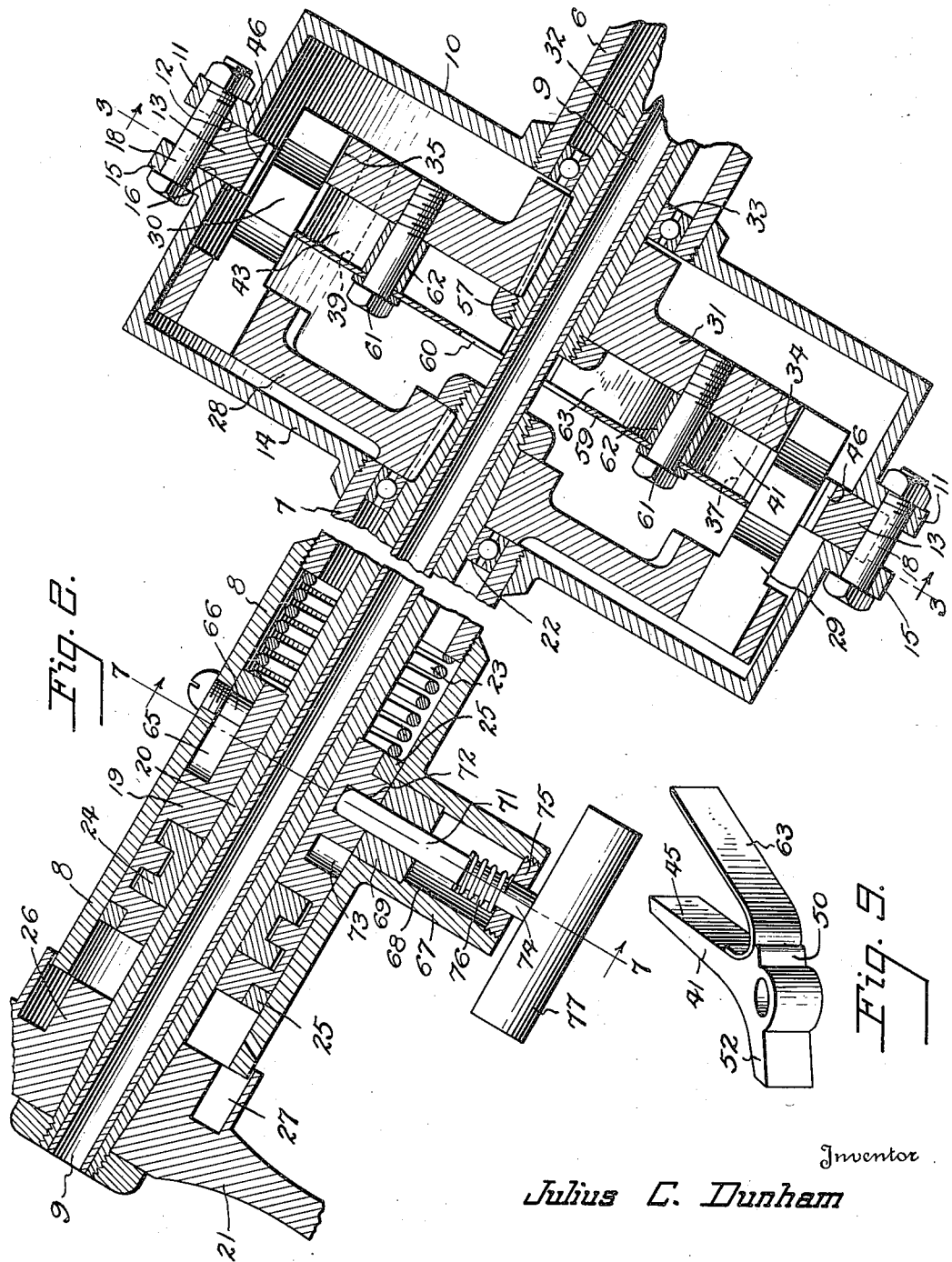

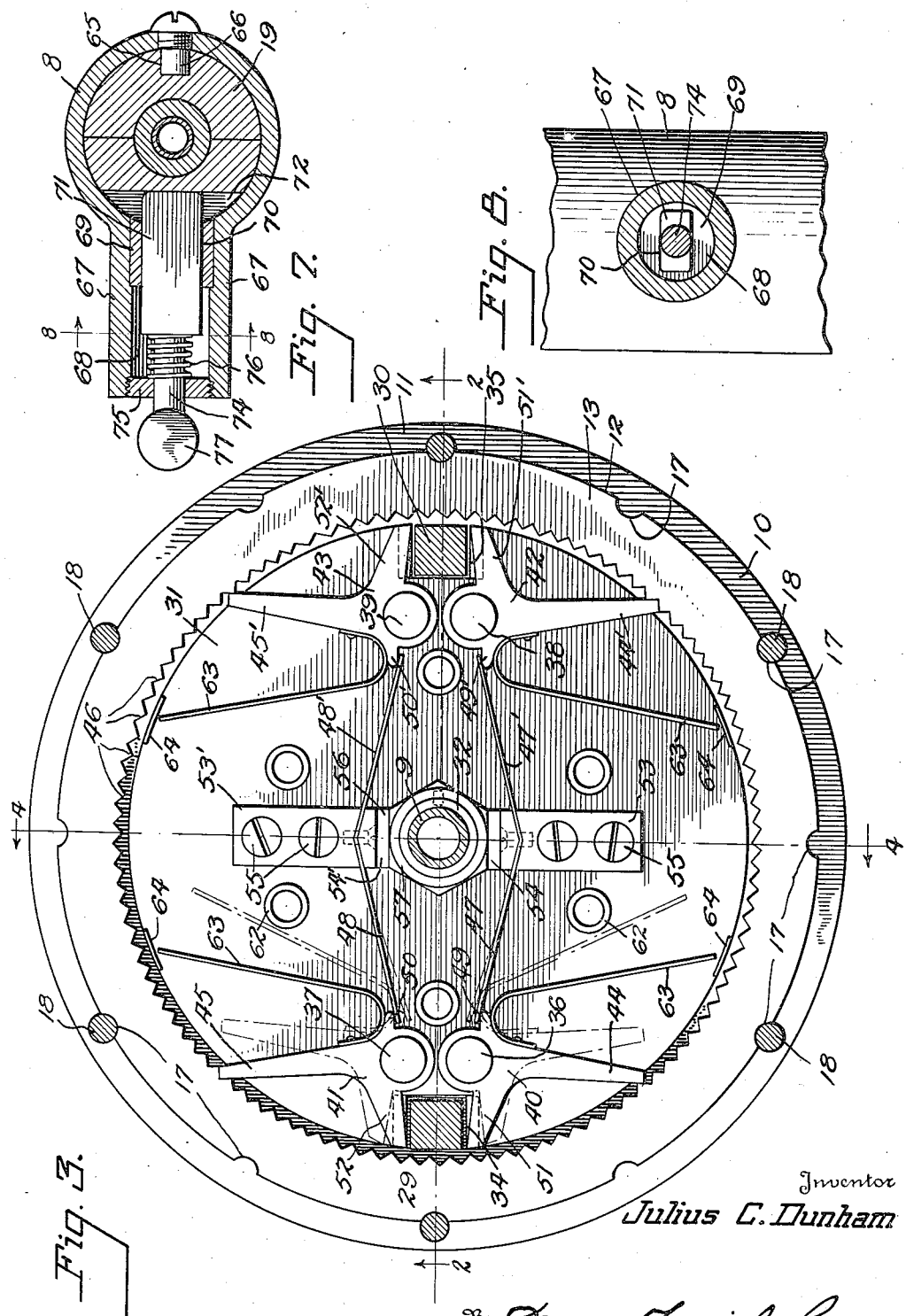

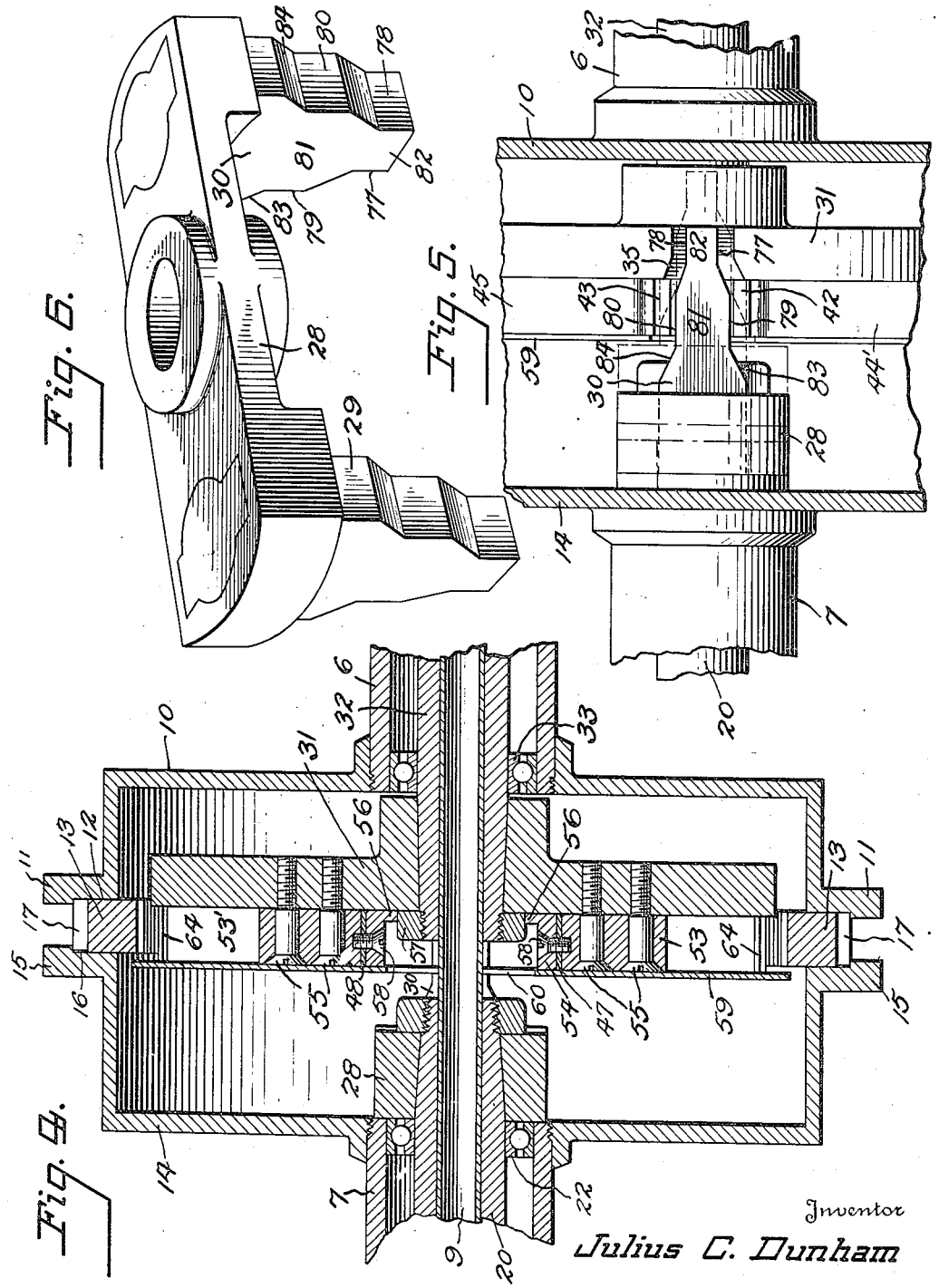

Patented July 28, 1936

2,049,111

UNITED STATES PATENT OFFICE 2,049,111

AUTOMATIC LOCK FOR STEERING DEVICES

Julius C. Dunham, Pensacola, Fla.

Application August 27, 1935, Serial No. 38,125

16 Claims. (Cl. 192—8)

This invention relates to an improvement in steering mechanism for automobiles and other vehicles in which such mechanism includes a shaft rotated in opposite directions to effect steering of such vehicles.

The main object of the invention is to provide the steering gear of a motor vehicle with mechanism which automatically locks the vehicle guiding means (wheels, rudder, etc.) in any angular position to which it may have been moved by the normal operation of the steering mechanism in the usual manner of steering.

Another and specific object of the invention is to provide a motor vehicle of the automobile type with automatically operable means for releasably locking the steering wheels of the automobile in any position to which they may have been adjusted by the manual and usual operation of the steering shaft; and which will not prevent operation of the steering mechanism in the usual manner.

Other objects of the invention will become apparent as the detailed description thereof proceeds.

In the drawings:

Figure 1 is a side elevation of the steering column of a motor vehicle, embodying the present invention;

Figure 2 is a fragmentary broken section taken lengthwise through the steering column shown in Figure 1;

Figure 3 is a section taken on the line 3—3 of Figure 2;

Figure 4 is a section taken on the line 4—4 of Figure 3;

Figure 5 is a broken elevation of part of the mechanism embodied in the invention;

Figure 6 is a perspective view of an operating element;

Figure 7 is a section taken on the line 7—7 of Figure 2;

Figure 8 is a section taken on the line 8—8 of Figure 7;

Figure 9 is a perspective view of a pawl forming part of the gear-lock mechanism;

Figure 10 is a longitudinal central section through a dashpot which may be used in connection with the present invention;

Figure 11 is a vertical transverse section taken on the line 11—11 of Figure 10;

Figure 12 is a vertical transverse section taken on the line 12—12 of Figure 10;

Figure 13 is a fragmentary detail of a modified form of one of the elements illustrated in Figure 10.

As shown in the drawings, the invention is embodied in a steering column, designated generally by the reference numeral 1, secured through the usual gear case 2 to a bracket 3 depending from a member 4 forming part of the chassis of a motor vehicle. The gearing in the casing 2 operates the link 5, which, in turn, operates the usual linkage (not shown) for moving the front or steering wheels of a motor vehicle into desired position.

The steering column is formed in three sections 6, 7 and 8, coaxial with the throttle and wire tube 9 which extends clear through the steering column. The lower section 6 is suitably secured at its lower end to the gear case 2; and at its upper end is screwthreaded into the center of a cylindrical cup 10. A flange 11 extends outwardly from the rim of cup 10, and is provided with an annular recess 12 forming a seat for a ratchet ring 13.

A cup 14 is screwthreaded at its center into the lower end of the section 7; and at its rim is provided with an outwardly extending annular flange 15 having formed therein an annular recess 16 to seat snugly on the upper face of the ratchet ring 13. The outer periphery of the ring 13 is provided with a series of arcuate recesses 17 adapted to receive the shanks of bolts 18 passing through registering apertures in the flanges 11 and 15.

The upper end of section 7 is suitably fixed to the enlarged section 8 in which is slidably mounted the split bearing 19 secured to the steering shaft member 20, and which in turn, is fixed to the throttle and wire tube 9. The usual steering wheel 21 is fixed to the upper end of shaft member 20; and a bearing 22 secured in the lower end of section 7 centers the shaft member 20 in the steering column.

A compression spring 23 surrounds the member 20 and yieldingly supports the bearing 19 on the upper end of section 7. A thrust collar 24 fixed to shaft member 20 supports the said member 20 for rotatable movement only in the split bearing 19, the parts of which are held in assembled relation by the rings 25. The hub 26 of the wheel 21 is provided with an annular recess 27 to receive the upper end of section 8 when the wheel 21 and shaft member 20, with its bearing 19, are pressed downwardly, against the pressure of spring 23, relative to the alined sections 7 and 8.

The lower end of the shaft member 20 has suitably secured thereto a cross head 28, having its opposite ends provided with downwardly projecting pins 29 and 30. A disk 31 is suitably fixed to the upper end of a shaft member 32, which, at its lower end is operatively secured to the gearing in the casing 2, in the usual manner. The member 32 is rotatable in the bearing 33, but is fixed against sliding movement therein since it is geared at its lower end to the operating gearing in casing 2.

The disk 31 is provided in its periphery with diametrically opposed slots 34 and 35 adapted to receive the pins 29 and 30, respectively. The pins 29 and 30 are similar in shape; and so are the slots 34 and 35. On opposite sides of a diameter passing through the center of the slots 34 and 35, the disk 31 has fixed thereto the pivot pins 36, 37, 38 and 39, on which are respectively pivoted the pawls 40, 41, 42 and 43.

The pawls are shaped as bell crank levers, and are arranged in pairs symmetrically on opposite sides of the diameter passing through the center of the slots 34 and 35. The pair of pawls 40 and 41 have long arms 44 and 45, respectively, extending in opposite directions toward the teeth 46 on the inner periphery of the annular ratchet 13. The ends of the arms 44 and 45 are held normally in yielding contact with the teeth 46, by the pressure of springs 47 and 48 on lugs 49 and 50 projecting from the rear edges of said pawls 40 and 41, respectively.

Short arms 51 and 52, on the pawls 40 and 41, respectively, extend on opposite sides of the slot 34; and have their ends terminated at the periphery of the disk 31 so that they never contact with the teeth on the ratchet ring 13. When the ends of arms 44 and 45 are in contact with ratchet teeth 46, the inside walls of the short arms 51 and 52 just clear the side edges of the slots 34.

The other pair of pawls 42 and 43 have long arms 44' and 45' extending in opposite directions, from their respective pivots 38 and 39, toward the teeth 46 of the ratchet ring 13. The outer ends of the arms 44' and 45' are held normally in contact with the teeth 46 by the pressure of springs 47' and 48' on the lugs 49' and 50' projecting from the rear edges of said pawls 42 and 43, respectively. Short arms 51' and 52', on the pawls 42 and 43, respectively, extend on opposite sides of the slot 35; and have their ends terminated at the periphery of disk 31. When the ends of arms 44' and 45' contact with the teeth 46 of the ratchet disk, the inside walls of the short arms 51' and 52' just clear the side edges of the slot 35.

The springs 47 and 47' are preferably made integral with each other, as are the springs 48 and 48'; and are suitably secured to the disk 31 by means of the pairs of clamping plates 53—54 and 53'—54', respectively, fixed to the disk 31 by machine screws 55. The clamping plates 54 and 54' are provided with horizontal flanges 56 adapted to engage opposite side edges of a nut 57 which clamp the disk 31 securely on the tapered upper end of the shaft member 32. Machine screws 58 are tapped into the plates 53 and 53' and pass through registering apertures formed in plates 54 and 54' and the springs 47—47', 48—48', to secure the clamping plates and springs rigidly together.

A circular cover plate 59, having an aperture 60 at its center to receive and clear the steering shaft, is secured to the disk 31 by machine screws 61 passing through spacer washers 62. The depth of the washers 62 is a trifle greater than that of the pawls 40, 41, 42 and 43, the springs 47—47', 48—48' and the clamping plate, so as to cover these parts, and at the same time hold the pawls from rising axially on their respective pivots.

It is intended that the housing formed by the cups 10 and 14 and the disk 13 shall be filled with thick lubricating oil. Retarding vanes 63 are secured to the backs of the pawls 40, 41, 42 and 43; and plates 64 are secured to the disk 31 at the periphery thereof in such positions as to prevent the ends of said vanes 63 contacting with the teeth 46 on the ratchet ring 13.

The oil performs a very important function in this device. For example, if the steering wheel be operated to release the pawls 44' and 45 from the ratchet teeth 46, the resistance of the heavy oil acts against the leading faces of the trailing pawls 44 and 45', and the vanes 63 connected thereto, to reduce the contact pressure of the ends of pawls 44 and 45' exerted by springs 47 and 48'. Naturally, this reduction in contact pressure greatly reduces wear on these parts and prolongs the life of the mechanism.

Conversely, if the disk 31 receives a sudden impulse from the guiding wheels of the vehicle, due to a blown out tire or other cause, the pressure of the oil, in the opposite direction on the pawls 44 and 45', and the vanes connected thereto, greatly augments the action of the springs 47 and 48' to force the ends of pawls 44 and 45' into locking engagement with the ratchet teeth.

It is to be noted that the throttle tube 9 is designed to slide in the lower steering shaft member 32; while the upper shaft section 20 is fixed to and slides with the throttle tube. The bearing 19 for the shaft member 20 is provided with a slot 65 to receive slidably a stud 66 screwthreaded into the column section 8. The stud 66 not only prevents rotation of the bearing 19, but also serves to limit the sliding movement of the bearing in the column section 8.

There are two operative positions of the bearing 19. In the position shown in Figure 2 the bearing 19, steering wheel 21, shaft section 20, and cross bar 28 are supported out of locking engagement with the lower shaft member 32 and elements connected thereto. To hold the bearing 19 and its associated elements in raised position, the column section 8 is provided with a laterally extending projection 67 having a bore 68 extending into the interior of column section 8.

The inner end of the bore 68 has a plug 69 fixed thereto; and this plug is provided with a slot 70 in which a bolt 71 is slidably and nonrotatably mounted. The inner end of the bolt 71 is adapted to seat snugly in either of the slots 72 and 73 formed in the bearing 19. When the bolt 71 is seated in slot 72, as shown in Figure 2, the safety device is in operation. When the bolt 71 is seated in slot 73, the steering wheel 21 and shaft section 20 secured thereto, are locked against rotation with respect to the lower shaft section 32.

To operate the bolt 71, the latter is provided at its outer end with a rod 74 slidably mounted in a centrally apertured plug 75, which is screw-threaded into the outer end of bore 68. A compression spring 76 surrounds the rod 74, and has its opposite ends abutting the bolt 71 and plug 75 to force the bolt normally against the bearing 19 and into either of the slots 72 and 73 when either is in position to receive the bolt. A knob 77 secured to the outer end of rod 74 may be used to pull the bolt 71 outwardly of the column section 8 against the pressure of spring 76.

The pins 29 and 30 on the cross bar 28 are identical in shape. The slots 34 and 35 in the disk 31 are also identical in shape. Therefore, the description of one pin and its cooperating slot will be sufficient to disclose the principle involved in their operation.

Consider now the pin 30 and slot 35 as shown particularly in Figures 5 and 6. The slot 35 has parallel sides 77 and 78 spaced apart a distance equal to that between the sides 79 and 80 of the intermediate part 81 of pin 30. The lower part 82 of the pin 30 is narrower than the slot 35, in order to permit engagement of the pawls with the teeth 46 of the ratchet ring 13 when the steering wheel and upper shaft section are in raised position.

The opposite parallel sides 79 and 80 are connected by the diverging sides 83 and 84 to the upper part of the pin, and these diverging sides are used to spread apart the short arms 51' and 52' of the pawls 42 and 43 to disengage the ends of the long arms 44' and 45' from the ratchet teeth 46 when the steering wheel and shaft mechanism fixed thereto are depressed to lock the shaft sections together. The dotted lines in Figures 3 and 5 illustrate this operation clearly.

It is evident that this safety mechanism would operate with only one pair of pawls. However, in order to secure proper balance of the forces involved in its operation, it is obviously necessary to arrange the various elements about a plane of symmetry passing through the axis of the steering shaft.

The device could be built to operate only with the safety mechanism; and obviously, would be cheaper when so built than it would be when provided with the means adapting it for adjustment to cut out the safety mechanism.

Primarily, the device was designed to eliminate the hazards resulting from the blow-out of a front tire on an automobile in motion. As is well known when such a blow-out occurs, the tendency of the vehicle is to swerve instantly and violently in the direction of the blown out tire. Such tendency is prevented by the present invention, since the front wheels are absolutely locked in the angular position prevailing immediately prior to the blow-out; and remain so locked until the operator deliberately operates the steering wheel to move in any direction desired.

No particular effort or vigilance on the part of the operator is required, since no motion can be transmitted from the guiding wheels of the vehicle to the steering wheel. If the driver were inattentive at the instant of the blow-out, or had his hands resting lightly on the steering wheel, there would be no possibility of the steering wheel being wrested from the hands; but the vehicle would continue its movement in the direction of the guiding wheels immediately prior to the blow-out. However, if the driver for any reason desires to steer the vehicle in either direction with the tire in its blown out condition, he can do this in the usual manner and with no more effort than would be required in a similar situation with the ordinary steering mechanism.

As so far described, the invention is complete and operative. In certain cases it may be desirable to add to the steering mechanism, a retarding device to slow down the return of the guiding wheels from a position where they are inclined to the longitudinal axis of the vehicle chassis to a position parallel to said axis. The ordinary automobile, after rounding a curve, will automatically straighten out its guiding wheels, if the driver removes his hands from the steering wheel. The effect of this straightening out operation is to straighten out the front wheels after rounding a curve faster than a driver would normally revolve the steering wheel to effect the same result. This causes the leading pawl points to contact slightly with, but not engage the ends of the ratchet ring teeth, which in time would wear the pawl points and ratchet teeth.

The condition occurs only when straightening out after turning the sharp right angle corners of city streets, and only at speeds in excess of nine or ten miles per hour; it does not occur at any speed on the relatively easy curves encountered on highways. This trouble may be eliminated by the use of any suitable mechanism such as that illustrated in Figures 10 to 13 of the drawings.

The retarding mechanism referred to comprises a cylinder 85 suitably pivoted at one end to the crank arm 5 of the steering gear. A piston rod 86 is pivoted at one end to a bracket 87 extending from the frame of the vehicle, and reciprocates through a packing gland 88 in the other end of the cylinder. Pistons 89 and 90 are formed on the piston rod and are provided with apertures 91 and 92 normally closed by valve plates 93 and 94, respectively, a weak coil spring 95 being used to hold said plates normally in closed positions.

A by-pass casing 96 is formed on one side of cylinder 85; and a passageway 97 somewhat longer than the distance between pistons 89 and 90, effects communication between the cylinder 85 and casing 96. Apertures 98 and 99 through cylinder 85 at opposite ends of casing 96 cooperate with apertured baffles 100 and 101, arranged between passageway 97 and apertures 98 and 99 in the by-pass casing, to provide for circulation of fluid in the attachment during the movements of the pistons in the cylinder 85. The openings in the baffles 100 and 101 are restricted to sizes which will permit a desirable rate of flow therethrough, and may be replaced by others of different sizes to vary the rate of flow whenever found desirable.

An alternative baffle construction is illustrated in Figure 13, in which the baffle 102 is shown as controlled by a spring pressed valve plate 103. The advantage of this construction is that the spring will provide for the proper resistance to the passage of fluid through the plate 102 for normal operation; but, in emergency such as the driver desiring to steer the vehicle quickly from a turning position to a straight ahead position, will permit the liquid to flow more rapidly by the driver's more violent operation of the steering wheel, thus, not impeding a quick steering action.

It is believed the operation of this dash pot retarding mechanism will be obvious from inspection of the drawings, to persons skilled in this art, without further explanation.

The construction shown on accompanying drawings indicates ratchet ring teeth with an angle of 90° between them, 45° each side of a radius line. The ratchet ring teeth do not necessarily have to be of this shape, but can be of any shape to match any particular design of the device. If it is desirable to have ratchet ring teeth of such a shape that adjacent pawl ends will not meet the sides of the teeth symmetrically or suitably, two ratchet rings adjoining each other may be employed so as to provide the form of teeth to accommodate adjacent pawl ends of different pairs. Also it is not necessary to have a different pawl pivot pin for each pawl; two pawls may be carried by one pin by reducing the thickness of the pawl at the pin location, and shifting the relative position of pawl heel on the body of the pawl to accommodate the operating pin.

What I claim is:

1. In steering mechanism, a support, a pair of axially alined shafts rotatable on said support, one of said shafts being axially slidable toward and from the other, means on said support and said other shaft for automatically locking said other shaft against rotation relative to said support, and means on the first named shaft operable by rotation thereof to release said locking mechanism and rotate the first named shaft in succession, the last named means being operable by sliding said other shaft toward the first named shaft to lock said shafts rigidly to each other.

2. A support forming a fixed part of a vehicle provided with mechanism for guiding its movements in different directions, a case fixed to said support, gearing in said case for operating said mechanism, a steering column fixed to said case, a steering shaft comprising two sections axially alined in said column, one of said sections being axially rotatable only in said column and connected at one end to said gearing, the other section being axially rotatable and slidable in said column toward and from the first named section, means in said column for automatically locking the first named section against rotation, and means fixed to said other section for releasing said locking means and rotating the first named section, in succession, said locking and releasing means being engageable by sliding movement of the said other section to lock the two sections rigidly to each other.

3. A vehicle, mechanism for steering said vehicle and comprising a steering column fixed to said vehicle, axially alined shafts rotatable independently in said column, means in said column and on one shaft for automatically locking said shaft against rotation, means on the other shaft and operable by rotation thereof for releasing said locking means and rotating the first named shaft in succession, and means for retarding the rotation of said first named shaft upon release of said locking means.

4. In steering mechanism, a support, a pair of axially alined shafts rotatable on said support, means on said support and one of said shafts for automatically locking said shaft against rotation relative to said support, means on the other shaft operable by rotation thereof to release said locking mechanism and rotate the first named shaft in succession, and means for retarding the rotation of said first named shaft upon release of said locking means.

5. In steering mechanism, a support, a pair of axially alined shafts rotatable on said support, one of said shafts being axially slidable toward and from the other, means on said support and said other shaft for automatically locking said other shaft against rotation relative to said support, means on the first named shaft operable by rotation thereof to release said locking mechanism and rotate the first named shaft in succession, the last named means being operable by sliding said other shaft toward the first named shaft to lock said shafts rigidly to each other, and means for retarding the rotation of said first named shaft upon release of said locking means.

6. In a steering device, a support, a pair of axially alined shafts rotatable independently on said support, one of said shafts being slidable toward and from the other, ratchet and pawl mechanism on the support and said other shaft for automatically locking said other shaft against rotation, and means on the slidable shaft operable by rotation thereof for releasing said mechanism and rotating said other shaft in succession and operable by the sliding of the first named shaft to lock both shafts rigidly to each other for rotation together.

7. In a steering device, a support, a pair of axially alined shafts rotatable independently on said support, one of said shafts being slidable toward and from the other, ratchet and pawl mechanism on the support and said other shaft for automatically locking said other shaft against rotation, means on the slidable shaft operable by rotation thereof for releasing said mechanism and rotating said other shaft in succession and operable by the sliding of the first named shaft to lock both shafts rigidly to each other for rotation together, and means for retarding rotation of the said other shaft upon release of said mechanism.

8. In steering mechanism, a support, a pair of axially alined shafts rotatable on said support, one of said shafts being axially slidable to different positions relative to the other, means on said support and said other shaft for automatically locking said other shaft against rotation relative to said support, and means on the first named shaft operable by rotation thereof in one of said positions to release said locking mechanism and rotate the first named shaft in succession, the last named means being operable by sliding said other shaft to another of said positions to lock said shafts rigidly to each other, and means for locking the first named shaft against sliding movement in either of said positions.

9. A support forming a fixed part of a vehicle provided with mechanism for guiding its movements in different directions, a case fixed to said support, gearing in said case for operating said mechanism, a steering column fixed to said case, a steering shaft comprising two sections axially alined in said column, one of said sections being axially rotatable only in said column and connected at one end to said gearing, the other section being axially rotatable and slidable to different positions in said column, means in said column for automatically locking the first named section against rotation, means fixed to said other section for releasing said locking means and rotating the first named section in succession, when said other section is in one of said positions, said locking and releasing means being engageable by sliding movement of the said other section to another of said positions to lock the two sections rigidly to each other, and means on said column and said other section for locking the said other section in either of said positions.

10. In a steering device, a support, a pair of axially alined shafts rotatable independently on said support, one of said shafts being slidable to different positions relative to the other, ratchet and pawl mechanism on the support and said other shaft for automatically locking said other shaft against rotation, means on the slidable shaft operable by rotation thereof in one of said positions for releasing said mechanism and rotating said other shaft in succession and operable by the sliding of the first named shaft to another of said positions to lock both shafts rigidly to each other for rotation together, and means for locking the first named shaft against sliding movement in either of said positions.

11. A steering mechanism comprising a fixed casing having an annular rack secured thereto, a shaft provided with a head rotatable in said casing, a pair of oppositely extending pawls pivoted to said head, yielding means normally holding said pawls in contact with the teeth of said rack to lock said shaft against rotation in either direction, a second shaft journalled in said casing and having means engageable alternatively with either of said pawls to move the engaged pawls out of locking engagement with the teeth of said rack, and means in said casing to reduce the pressure of said yielding means when the second shaft is rotated in pawl releasing direction.

12. A steering mechanism comprising a fixed casing having an annular rack secured thereto, a shaft provided with a head rotatable in said casing, a pair of oppositely extending pawls pivoted to said head, yielding means normally holding said pawls in contact with the teeth of said rack to lock said shaft against rotation in either direction, a second shaft journalled in said casing and having means engageable alernatively with either of said pawls to move the engaged pawls out of locking engagement with the teeth of said rack, means in said casing to reduce the pressure of said yielding means when the second shaft is rotated in pawl releasing direction, and to supplement said pressure when rotation of the first named shaft is suddenly reversed.

13. Steering mechanism comprising a fixed casing having an internal annular rack, a shaft provided with a head mounted to rotate in said casing about the axis of said rack, and having a peripheral recess formed therein, a pair of bell crank levers pivoted to said head, and having one pair of arms extending in opposite directions from said recess to engage the teeth of said rack, the other pair of arms of said levers extending on opposite sides of said recess with their ends clear of said teeth, yielding means for normally holding the first named arms in contact with said teeth, a second shaft journalled in said casing and having means extending into said recess and adapted by rotation of said second shaft to engage alternatively and successively either of the arms on opposite sides of said recess and the side of the recess adjacent to the engaged arm, to release the head from locked relation to said rack and to transmit the rotation of the second shaft to the first named shaft.

14. Steering mechanism comprising a fixed casing having an internal annular rack, a shaft provided with a head mounted to rotate in said casing about the axis of said rack, and having a peripheral recess formed therein, a pair of bell crank levers pivoted to said head, and having one pair of arms extending in opposite directions from said recess to engage the teeth of said rack, the other pair of arms of said levers extending on opposite sides of said recess with their ends clear of said teeth, yielding means for normally holding the first named arms in contact with said teeth, a second shaft journalled in said casing and having means extending into said recess and adapted to rotation of said second shaft to engage alternatively and successively either of the arms on opposite sides of said recess and the side of the recess adjacent to the engaged arm, to release the head from locked relation to said rack and to transmit the rotation of the second shaft to the first named shaft, and means in said casing to reduce the pressure of said yielding means when either pawl is released by rotation of said second shaft.

15. Steering mechanism comprising a fixed casing having an internal annular rack, a shaft provided with a head mounted to rotate in said casing about the axis of said rack, and having a peripheral recess formed therein, a pair of bell crank levers pivoted to said head, and having one pair of arms extending in opposite directions from said recess to engage the teeth of said rack, the other pair of arms of said levers extending on opposite sides of said recess with their ends clear of said teeth, yielding means for normally holding the first named arms in contact with said teeth, a second shaft journalled in said casing and having means extending into said recess and adapted to rotation of said second shaft to engage alternatively and successively either of the arms on opposite sides of said recess and the side of the recess adjacent to the engaged arm, to release the head from locked relation to said rack and to transmit the rotation of the second shaft, to the first named shaft, means in said casing to reduce the pressure of said yielding means when either pawl is released by rotation of said second shaft, and to supplement said pressure when rotation of the first named shaft is suddenly reversed.

16. Steering mechanism comprising a fixed casing having an internal annular rack, a shaft provided with a head mounted to rotate in said casing about the axis of said rack, and having a peripheral recess formed therein, a pair of bell crank levers pivoted to said head, and having one pair of arms extending in opposite directions from said recess to engage the teeth of said rack, the other pair of arms of said levers being shorter than the first named pair and extending on opposite sides of said recess with their ends clear of said teeth and with their adjacent edges inclined toward each other in the direction of said rack, yielding means for normally holding the first named arms in contact with said teeth, a second shaft journalled in said casing, a cross head fixed to said shaft, and a pin depending from said cross head and extending into said recess and adapted by rotation of said second shaft to engage alternatively and successively either of the arms on opposite sides of said recess and the side of the recess adjacent to the engaged arm, to release the head from locked relation to said rack and to transmit the rotation of the second shaft to the first named shaft.

JULIUS C. DUNHAM.